UNITED STATES PATENT OFFICE.

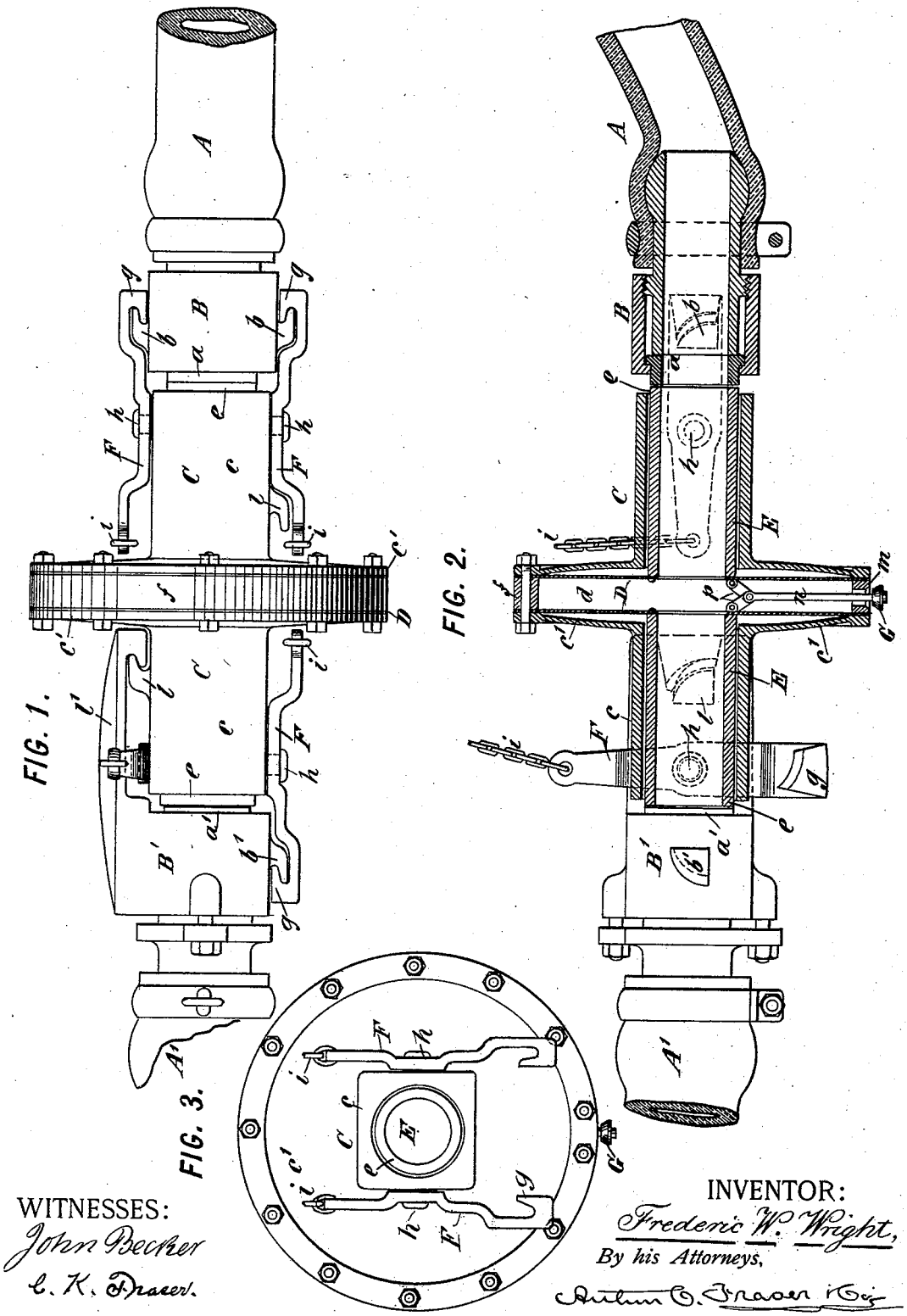

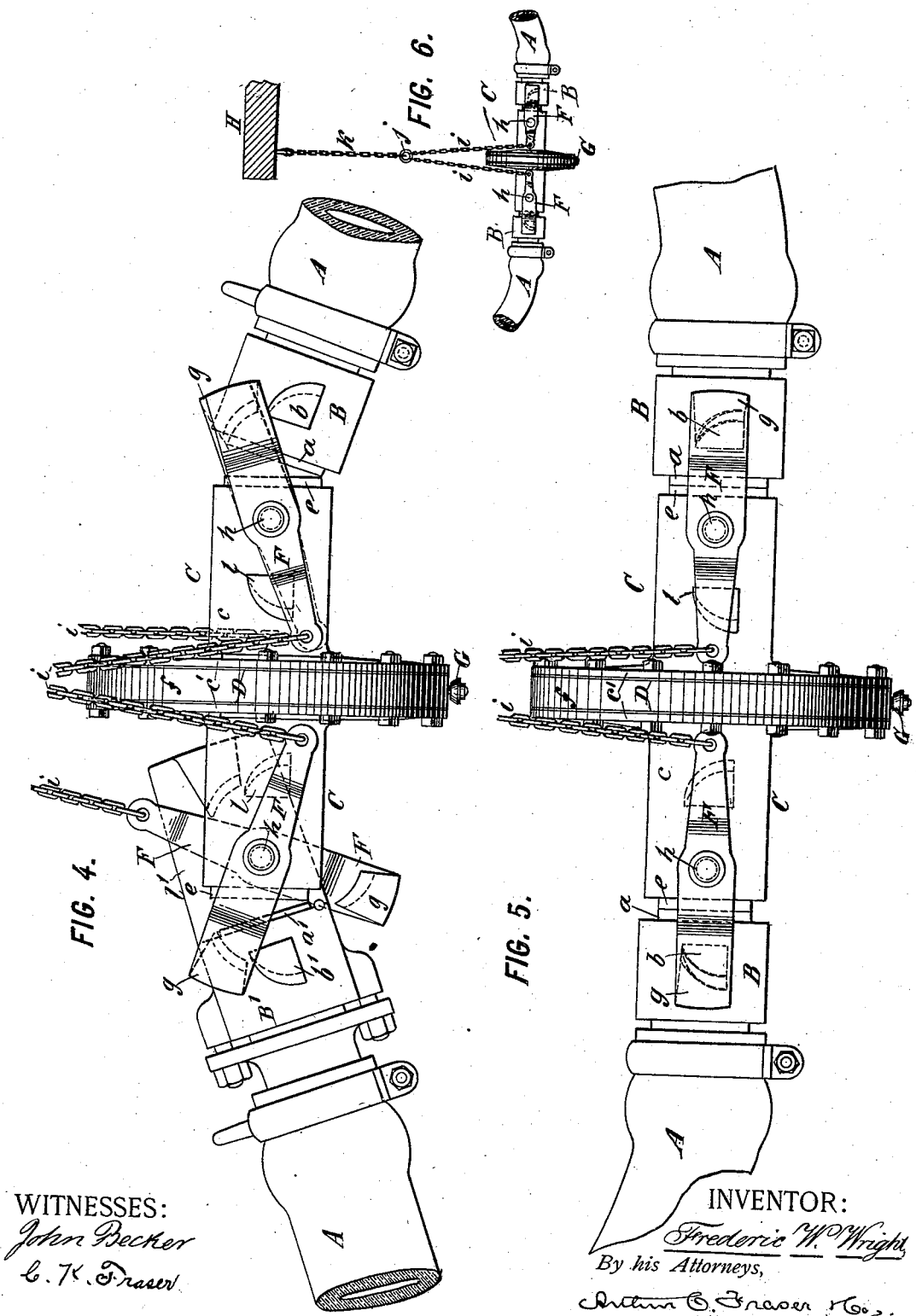

FREDERIC W. WRIGHT, OF GREAT NECK, NEW YORK.

HOSE-COUPLING.

SPECIFICATION forming part of Letters Patent No. 477,239, dated June 21, 1892.

Application filed July 11, 1891. Serial No. 399,179. (No model.)

*To all whom it may concern:*

Be it known that I, FREDERIC W. WRIGHT, a citizen of the United States, residing in Great Neck, in the county of Queens and State of New York, have invented certain new and useful Improvements in Hose - Couplings, (Case G,) of which the following is a specification.

This invention relates to couplings adapted for connecting together lengths of rigid or flexible pipe or hose. It is especially designed for use in connection with the steam-heating pipes of railway-cars, but is also applicable for other purposes.

According to my present invention I provide the ends of the respective lengths or sections of pipe or hose that are to be coupled together with coupling-heads having seats at their ends, and I provide an intermediate coupling-section, which is coupled in between the seats of the respective heads, forming itself a part of the steam-passage from one head to the other. The coupling-heads are provided with any suitable locking projections, and the intermediate coupling-section is provided with locking devices adapted to engage these projections on the respective heads and to draw each of the heads toward the intermediate section in order to make a steam-tight joint between. To further tighten this joint and enable it to resist a heavy pressure, the intermediate section is provided with one or more diaphragms in connection with the seats thereof, which diaphragms are adapted to be deflected by the steam-pressure, and thereby to force the seats upwardly against the coinciding seats of the respective coupling-heads with a pressure proportional to the steam-pressure, so that with an increased steam-pressure the tightness of the joint is increased. The intermediate coupling - section is also provided with an automatic trap for draining off water of condensation, consisting of a valve connected to the diaphragm or diaphragms, so that when steam is turned on the valve is closed and when turned off or sufficiently reducing the steam - pressure the valve opens and permits the condensation water to drain off.

My improved coupler is adapted, among other advantages, to intercouple with the so-called "Sewall" coupler, which is important whenever cars provided with my couplers are joined in a train with cars provided with the Sewall couplers.

Figure 1 of the accompanying drawings is a plan view of my improved coupling, showing it coupled with a Sewall coupler. Fig. 2 is a vertical mid-section thereof, the head of the Sewall coupler, however, being in elevation. Fig. 3 is an end view of the intermediate section of my improved coupler. Fig. 4 is a side elevation showing the act of coupling. Fig. 5 is a side elevation of my improved coupling when coupled, both the coupling-heads in this view being those pertaining to my present invention. Fig. 6 is a side elevation, on a reduced scale, of my coupling, showing it coupled and illustrating the means of suspending it from the car.

Let A A' designate the respective lengths of hose or pipe to be coupled together, and B B the coupling-heads applied thereto, the head of the Sewall coupling shown in Figs. 1, 2, and 4 being lettered B'.

C is the intermediate coupling-section as a whole.

In the drawings the pipes A A' are shown as flexible hose, as is most ordinarily used for the coupled ends of the pipes of railway-car-heating systems. Rigid pipes may, however, be used with my invention.

The heads B B of my invention are simple round or square heads suitably united to the ends of the hose or pipe—as, for example, in the manner shown in Fig. 2, which is a common and well-known manner. Each head is formed with a seat $a$ on its end and with locking projections $b$ $b$ on its opposite sides. These are preferably formed and arranged exactly like the locking projection $b'$ of one side of the ordinary Sewall coupler.

The intermediate section C is constructed with a shell or casing $c$ of any suitable form or arrangement, swelled, preferably, at its middle at $c'$ to form a diaphragm-chamber $d$. The opposite ends of the section C are provided with seats $e$ $e$, adapted to make contact with the seats $a$ $a$ of the coupling-heads. These seats are formed on or attached to the ends of tubes E E, inclosed within the shell $c$ of the section C and made movable therein in longitudinal direction. The construction wherein the shell $c$ is made tubular and closely but freely inclosing the tubes E E is a suitable and convenient one.

Within the diaphragm-chamber d are mounted two diaphragms D D, spaced apart by a ring f between them, and between which and the flanges on the portions c' c' of the shell the edges of the diaphragms are clamped with a steam-tight joint. The diaphragms have holes in their middles coinciding with the bore of the tubes E E, and they are brazed or otherwise united to these tubes to form a steam-tight joint.

The exterior of the shell c has pivoted to it locking-levers F F, preferably four in number, two at each end on opposite sides. Each of these levers is formed with a hook g at one end, adapted when the lever is turned down to engage the corresponding projection b of the coupling-head B. The levers are pivoted to the shell c at about their middles on pivots h h. Their locking-hooks g are formed eccentric to their pivots, so that in the act of engaging them with the projections b b, which likewise have eccentric or wedging working faces, the two are wedged firmly together in such manner as to draw the section C and head B toward one another, and thereby fasten them together with their respective seats e and a in firm contact. To hold them thus in engagement, the opposite ends of the levers are connected by chains i i to some suitable overhead support. To this end the four chains i i may be connected to a ring j, which is hung by a single chain k from a suitable support H, which may be the platform of one of the cars, to which the section C is thus connected in the manner shown in Fig. 6. The entire weight of the coupling and the weight of the end portions of attached hose are consequently borne through the medium of these chains, which thus maintain a constant tension upon the locking-levers F F, acting to hold them locked.

In order that my improved coupler may be intercoupled with the Sewall coupler, I provide the section C with external locking projections l l, which may be engaged by the hooked end of the locking-arm l' of the Sewall coupler in the manner shown clearly in Fig. 1. In order to couple with a Sewall coupler, the lever F on the side engaged by this arm l' is first turned outwardly, as shown in Fig. 2, after which the Sewall coupler is locked with the projection l and the lever F on the opposite side is turned down to engage the projection b' on the Sewall coupler, as shown at the left in Fig. 1. In coupling with the head B of my improved coupler the head is brought against the head of the coupling-section C, the levers F F of which have first been turned up, and these levers are then turned down and wedged into tight engagement with the projections b b. When steam is turned on, the steam, entering between the two diaphragms D D, presses them apart with a pressure proportional to the area they present to the steam, and this pressure is communicated to the tubes E E, to the seating-faces or ends e e thereof, which are thus forced firmly against the opposite seats a a of the coupling-heads. The higher the steam-pressure, and the greater consequently the tendency in ordinary couplers to leak at the seating-faces, the more strongly are the diaphragms D D pressed apart, and consequently the more intimately are the seating-faces pressed together to resist leakage.

In order to turn off any water of condensation that may accumulate in the pendent portions of the hose and in the coupling, I provide an automatic drainage-trap, which I will now describe. The lower side of the diaphragm-chamber d is formed with an outlet-opening m, having a valve-seat, and a valve G is provided to work against this seat. It is mounted on a stem n, passing upwardly through the chamber d and connected in any suitable manner with the diaphragms D D or with one of them, so as to derive motion therefrom, in such manner that when steam is turned on the deflection of the diaphragm or diaphragms shall lift the valve and press it tight around the seat, but when steam is turned off the retraction of the diaphragm or diaphragms shall thrust down the rod n and press the valve away from its seat, thereby providing an opening through which any accumulated condensation-water may flow out. The discharge of condensation-water will consequently occur whenever the steam-pressure is relieved, the operation in this respect being the same as that of the dynamic drainage-traps or trap-valves now used in connection with steam-heating apparatus for railway-cars. The construction shown for communicating the movement of the diaphragms to the rod n consists of two links or toggle-arms p p, as clearly shown in Fig. 2; but other means may be used instead and the valve G may be otherwise constructed, all that is essential being that some suitable kind of valve be employed which shall derive its opening and closing movements from the movements of a diaphragm or diaphragms acted upon by the steam-pressure.

My invention is not necessarily confined to the exact details of construction which I have shown and described, as these may be modified in many ways without departing from the essential features of my invention, which I will attempt to define in the claims. For example, the locking devices for coupling the intermediate section C to the head B or B' may be varied by the substitution of other means for the locking-levers F F, and other locking provisions may be applied to the coupling-heads than the wedging projections b b. The construction shown, however, I consider the best embodiment of my invention.

Throughout this specification I have referred to the portion C as an "intermediate" coupling-section; but it will be understood that it is essentially a coupling-head, since it couples with each of the heads B B or B' and since in coupling with either one thereof after being coupled to the other it constitutes the terminal head in connection with the hose. The coupling-heads B B are also essentially coupling-sections.

I have used the terms "heads" and "sections" in this specification as convenient terms to designate, respectively, the parts B B' and the part C. It is not to be inferred, however, from the use of these terms that the attributes of the respective parts are necessarily different.

It will be within the spirit of my invention, in a broad sense, if certain features of construction peculiar to the section C were transferred to the heads B B, or vice versa. For example, the diaphragms D D and movable tubes E E might be applied to the heads B B instead of to the intermediate section.

My invention is not necessarily limited in all respects to the use of an intermediate coupling head or section C, since a head or section having, essentially, the construction of one-half of this section C might be connected permanently to the length of hose and employed to couple with the opposite head. My invention may thus be variously modified without departing from its essential features.

I claim as my invention the following-defined novel features, substantially as hereinbefore specified, namely:

1. In a hose-coupling, the combination of two coupling heads or sections having abutting seats, with a locking projection on one of them having its locking-face inclined to tighten by a downward movement and a two-armed locking-lever pivoted to the other, with one of its arms adapted to engage said projection, and a suspending device from which the opposite arm of said lever is hung, whereby the weight of the coupling, acting through the lever and suspending device, serves to thrust downward the engaging arm of the locking-lever, and thereby hold it in engagement with the projection.

2. In a hose-coupling, the combination of two coupling heads or sections having abutting seats, opposite locking projections formed on one of them, opposite locking-levers pivoted to the other of them, having each a locking-arm on one side of its fulcrum and a suspending arm or tail on the opposite side thereof, and chains connected to the tails of said levers, from which the coupling is suspended.

3. In a coupling, an intermediate coupling-section C, having locking-levers F F pivoted to its opposite sides and a locking projection $l$ on one side, whereby it is adapted for engagement either with a coupling-head B, having opposite locking projections $b$ $b$, or by turning one of the levers out of the way with a Sewall coupling B', substantially as specified.

4. In a hose-coupling, a coupling head or section C, formed with a diaphragm-chamber $d$, a diaphragm D therein, and a tube E, connected therewith and formed with the terminal seat $e$ of the coupling at its end and with locking provisions for coupling it to an adjoining coupling-head.

5. In a hose-coupling, an intermediate coupling-section C, formed with a casing $c$ and a diaphragm-chamber $d$, two diaphragms D D at opposite sides of said chamber, so that steam may enter between them, and tubes E E, attached to said diaphragms, extending through the shell $c$ to the opposite ends thereof, and formed with seats $e$ $e$.

6. In a hose-coupling, a coupling head or section formed with a drainage-opening for draining off water of condensation, a trap-valve for closing said opening, and a diaphragm exposed to the steam-pressure within the head and connected to and operating said valve, whereby when the steam-pressure is turned on the deflection of said diaphragm closes the valve and when the steam is turned off the retraction of the diaphragm opens the valve.

7. In a hose-coupling, an intermediate coupling head or section C, formed with a diaphragm-chamber $d$, having a drainage-opening $m$, a diaphragm in said chamber, and a valve G, adapted to close said opening and connected to and moved by said diaphragm.

8. In a hose-coupling, an intermediate coupling-section C, having opening $m$, a valve G for closing said opening, its stem $n$, toggle-links $p$ $p$, and diaphragms D D, connected to said links, whereby the movements of said diaphragms are transmitted to the valve to open or close it.

9. In a hose-coupling, an intermediate coupling-section C, having seats at its opposite ends, locking-levers F F, pivoted to it at opposite sides and ends, suspending-chains $i$ $i$, support H, and intervening chain $k$, substantially as specified.

In witness whereof I have hereunto signed my name in the presence of two subscribing witnesses.

FREDERIC W. WRIGHT.

Witnesses:
GEORGE H. FRASER,
CHARLES K. FRASER.